US007423398B2

(12) United States Patent
Tyni et al.

(10) Patent No.: US 7,423,398 B2
(45) Date of Patent: Sep. 9, 2008

(54) ELEVATOR ARRANGEMENT

(75) Inventors: Tapio Tyni, Hyvinkää (FI); Pekka Perälä, Kerava (FI)

(73) Assignee: Kone Corporation, Helsinki (FI)

( * ) Notice: Subject to any disclaimer, the term of this patent is extended or adjusted under 35 U.S.C. 154(b) by 204 days.

(21) Appl. No.: 11/487,364

(22) Filed: Jul. 17, 2006

(65) Prior Publication Data

US 2007/0016332 A1 Jan. 18, 2007

Related U.S. Application Data

(63) Continuation of application No. PCT/FI2005/000025, filed on Jan. 17, 2005.

(30) Foreign Application Priority Data

Jan. 23, 2004 (FI) ................................ 20040104

(51) Int. Cl.
*H02P 1/04* (2006.01)

(52) U.S. Cl. ................................................ 318/432

(58) Field of Classification Search .................. 318/432
See application file for complete search history.

(56) References Cited

U.S. PATENT DOCUMENTS

2003/0217894 A1 11/2003 Perala et al.

FOREIGN PATENT DOCUMENTS

EP 0 298 784 A2 1/1989

*Primary Examiner*—Lincoln Donovan
*Assistant Examiner*—Erick Glass
(74) *Attorney, Agent, or Firm*—Birch, Stewart, Kolasch & Birch, LLP

(57) ABSTRACT

The method of the present invention can be used to monitor and predict the condition of an automatic door of an elevator or more generally an automatic door in a building. In the method, the acceleration or velocity of the door is measured and a dynamic model of the door is created. Using the model, estimated values of acceleration or velocity of the door can be calculated as a function of unknown parameters. One of the unknown parameters is the frictional force acting on the door during movement. By utilizing the estimated acceleration or velocity as well as measured acceleration or velocity values, an error function is obtained, whose minimum value is found using an optimizer. The unknown parameters corresponding to the minimum value indicate the current condition of the door. On the basis of earlier measurement results, it is additionally possible to predict a point of time when a failure is likely to occur in the operation of the door. In addition to unknown force parameters, it is possible, using a genetic algorithm, to determine the operational condition of a door closing device as well.

14 Claims, 4 Drawing Sheets

ELEVATOR ARRANGEMENT

Figure 1:
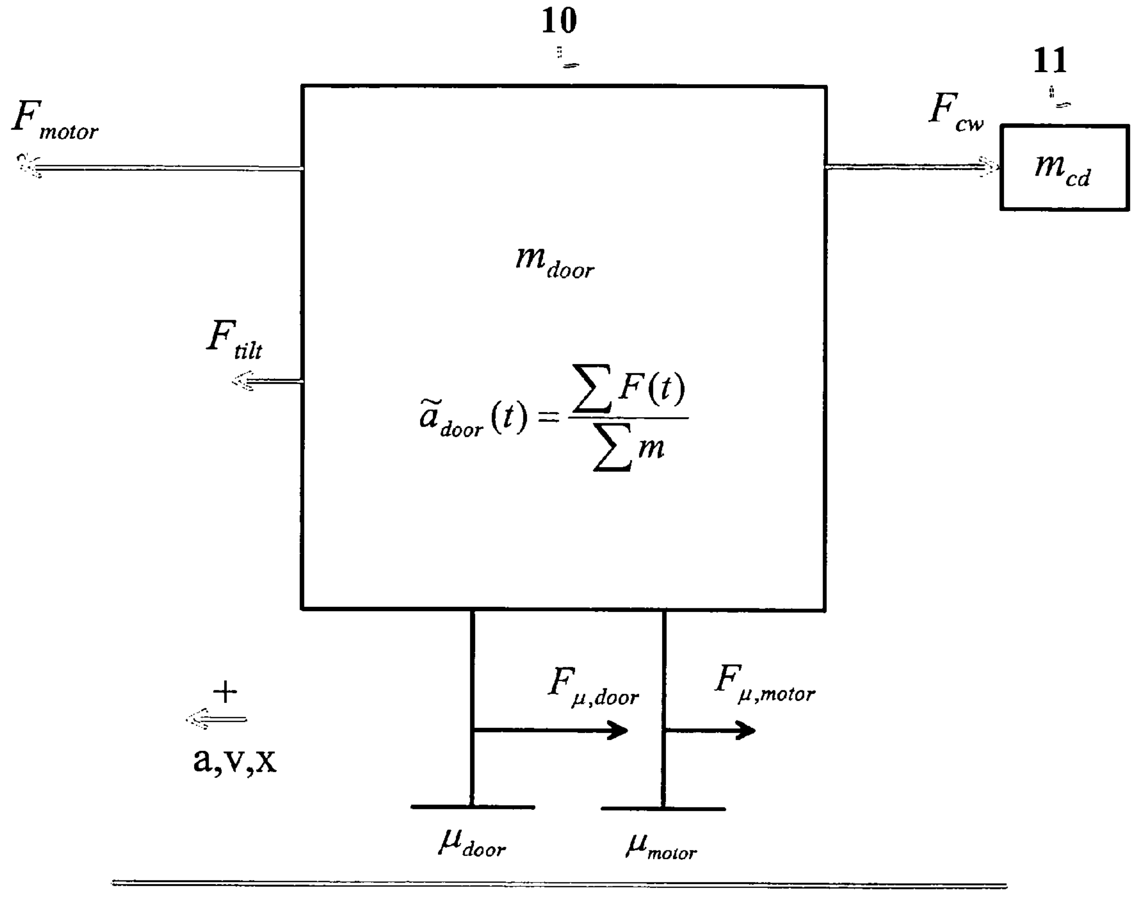

This application is a Continuation of copending PCT International Application No. PCT/FI2005/000025 filed on Jan. 17, 2005, which designated the United States, and on which priority is claimed under 35 U.S.C. § 120. This application also claims priority under 35 U.S.C. § 119(a) on Patent Application No(s). 20040104 filed in Finland on Jan. 23, 2004. The entire contents of each of the above documents is hereby incorporated by reference.

FIELD OF THE INVENTION

The present invention relates to fault management of a computer-controlled door either in an elevator system or in another system containing the components in question.

BACKGROUND OF THE INVENTION

A mechanical system in normal operational condition comprises a certain amount of frictional force due to friction that resists movement. If the magnitudes of the frictional forces in the system can be determined by measuring or mathematically, this information can be utilized as an indicator of the operational condition of the system.

An elevator system contains numerous components that are exposed to chafing and wear. The motion of the elevator car causes wear of components, including e.g. the elevator ropes and the guide rails of the elevator car. One of such components is the elevator door, which moves automatically on a horizontal rail. It is acted on by forces applied to it from different directions, and both its upper and lower edges are in contact with rails keeping the door movement on its track. There is also a frictional force opposing the motion of the automatic door. The operation of the door may be disturbed when a sufficient amount of dirt is accumulated on the door rail on the threshold of the elevator car. Due to this physical obstruction, the force opposing the motion of the door may grow to a magnitude such that finally the door control system is no longer able to open or close the door.

The magnitude of the frictional force can not be measured directly. It is not possible to mount a separate "friction meter" on the door. The magnitude of the friction resisting the movement of the door has to be measured indirectly. It is possible to create a model of the system to be examined, in this case the elevator door, to study the forces applied to the door. One of the forces appearing in the model is the frictional force opposing the motion. Using the model, it is possible to calculate desired parameters when the magnitudes of the forces opening and closing the door are known and the acceleration or velocity of the door is measured. In this way, unknown parameters, such as frictional force, can be solved. Thus, the matter at hand is a problem of optimization and estimation of parameters.

For example, in an elevator system the door assembly consists of a car door moving with the car and the landing doors on different floors. A modern automatic elevator door is opened and closed by means of a direct-current motor. The torque produced by the direct-current motor is directly proportional to the motor current. The energy of the motor is transmitted to the door e.g. via a toothed belt and the door moves on rollers. For reasons of safety, the landing door alone is closed without a motor by means of a closing device. The closing force of the closing device may be produced by a closing weight or a helical spring. The motor current and the corresponding torque are measured either from the door control card or directly from a motor current conductor. It is also possible to monitor a so-called tacho pulse signal of the motor. The tacho signal is a square wave whose frequency depends on the motor speed and therefore the door speed.

The problem with prior-art solutions is that the frictional force acting on the elevator door can not be measured directly. This necessitates the use of an indirect method of estimating the magnitude of the frictional force. The magnitude of the frictional force is needed for an estimation of the time to failure of the door or for predicting a future time by which the operational condition of the door will decline to a level consistent with a given criterion.

OBJECT OF THE INVENTION

The object of the present invention is to detect the operational condition of an electric automatic door used in an elevator system or in some other system, by continuously monitoring the magnitude of the frictional force opposing the motion of the door.

BRIEF DESCRIPTION OF THE INVENTION

The method and system of the invention are characterized by what is disclosed in the characterization parts of claims 1 and 8. Other embodiments of the invention are characterized by what is disclosed in the other claims.

Inventive embodiments are also presented in the description part of the present application. The inventive content disclosed in the application can also be defined in other ways than is done in the claims below. The inventive content may also consist of several separate inventions, especially if the invention is considered in the light of explicit or implicit sub-tasks or in respect of advantages or sets of advantages achieved. In this case, some of the attributes contained in the claims below may be superfluous from the point of view of separate inventive concepts. Within the framework of the basic concept of the invention, features of different embodiments of the invention can be applied in conjunction with other embodiments.

The method of the invention can be used for real-time examination of the condition of an automatic door of an elevator or more generally an automatic door in a building. In more precise terms, an automatic door is a horizontally sliding door which is controlled by a motor and whose closing movement may be assisted by a closing device. The door is acted on by various forces, of which we are now particularly interested in the magnitude of the frictional force applied to the door. From the frictional force, it is possible to deduce an acute maintenance need and in less serious cases information regarding the frictional force can be used at best to anticipate a future time at which disturbances will most probably begin to appear in the operation of the door. The operational condition of the closing device of the door can be determined immediately.

In an embodiment of the method of the present invention, the velocity of the automatic door is measured. This can be accomplished by using the so-called tacho signal obtained from the door motor. The tacho signal is a square wave in which the space between pulses depends on the speed of the motor and therefore on the door speed. The door speed can be calculated from the tacho signal. An essential part of the method is a dynamic model of the door. Some of the parameters in the model are updated after each pure door sequence. Pure door sequence means door opening and closing operations wherein no re-openings occur during the closing movement. The model includes the door and the closing device and the forces applied to these parts, including the frictional force.

Using the model as an aid, the acceleration of the door is estimated, and from this the door speed as a function of time. The measured and the estimated instantaneous speeds are compared to each other and an error term is obtained. At each instant of time, the error term is a function of three variables (mass of the door, frictional force applied to the door, and force resulting from inclination of the door). Next, the sum of the squares of the error terms is calculated, wherein each square of an error term is weighted by a desired weighting coefficient. For the so-called squared error term obtained as a result, a minimum value is found, in which situation the three model parameters being searched for are best in keeping with reality. From the magnitude of the frictional force thus obtained, the present state of the operational condition of the door can be deduced.

In another embodiment of the method of the present invention, the acceleration of the door is measured using an acceleration sensor placed on the door. The method works as above except that in this case the quantity estimated in the dynamic model is acceleration. In the calculation of the error term, the instantaneous acceleration estimated from the model is subtracted from the instantaneous measured acceleration. In this embodiment, too, the error term is a function of the aforesaid three variables and the further processing for determining these parameters proceeds as in the example described above.

The input parameters needed for the dynamic model of the door are door velocity, current of the motor driving the door, torque coefficient of the motor, motor friction and mass of door closing weight or force factor of closing spring.

The calculation can be simplified by defining the mass of the door as a constant among the variables. In this case, the mass of the door is determined in connection with the start-up or commissioning of the system by taking the mean value from a desired number of door operations. The length of the "teaching period" to be examined may be e.g. about twenty door operations. Once the mass has been determined as a mean value of the results of the teaching period, the mass of the door is then set as a constant. After this, a function of only two variables (the frictional force of the door and the force caused by tilting of the door) is processed in the optimization logic, so the processing requires less calculation capacity and time than above. The mass of the door can be defined as a constant because it can be assumed that it will not change significantly in normal operating conditions.

For immediate detection of a failure of the door closing device, it is possible to use a genetic algorithm (GA). Via the GA, both a correct door system model (with or without closing device) and unknown forces relating to door friction and tilt can be determined simultaneously. The parameters of the dynamic model of the door are coded into a chromosome of the genetic algorithm. In this connection, unknown parameters relating to the operation of the closing device, to the frictional force applied to the door and to the force caused by the angle of tilt of the door are genes, in other words, they together constitute a chromosome. The chromosome quality function is a squared error function, which can be regarded as an indicator of the performance of the solution or phenotype represented by the chromosome. With different gene values or alleles, correspondingly different phenotypes are obtained, of which the GA optimizer finally chooses, as a result of a search, a phenotype giving the minimum value. The gene values corresponding to this phenotype indicate the condition of the door system at the instant of examination.

One of the advantages of the method according to the present invention is that the information relating the operation of the door can be saved. In this way, a data base covering the operating history of the door is created, on the basis of which it is possible to plan e.g. a suitable date for the next maintenance. From the operating history, the present state of operation of the door can be deduced directly, and even the probability of failure and the need for maintenance at a future point of time can be predicted.

LIST OF FIGURES

Figure 2:
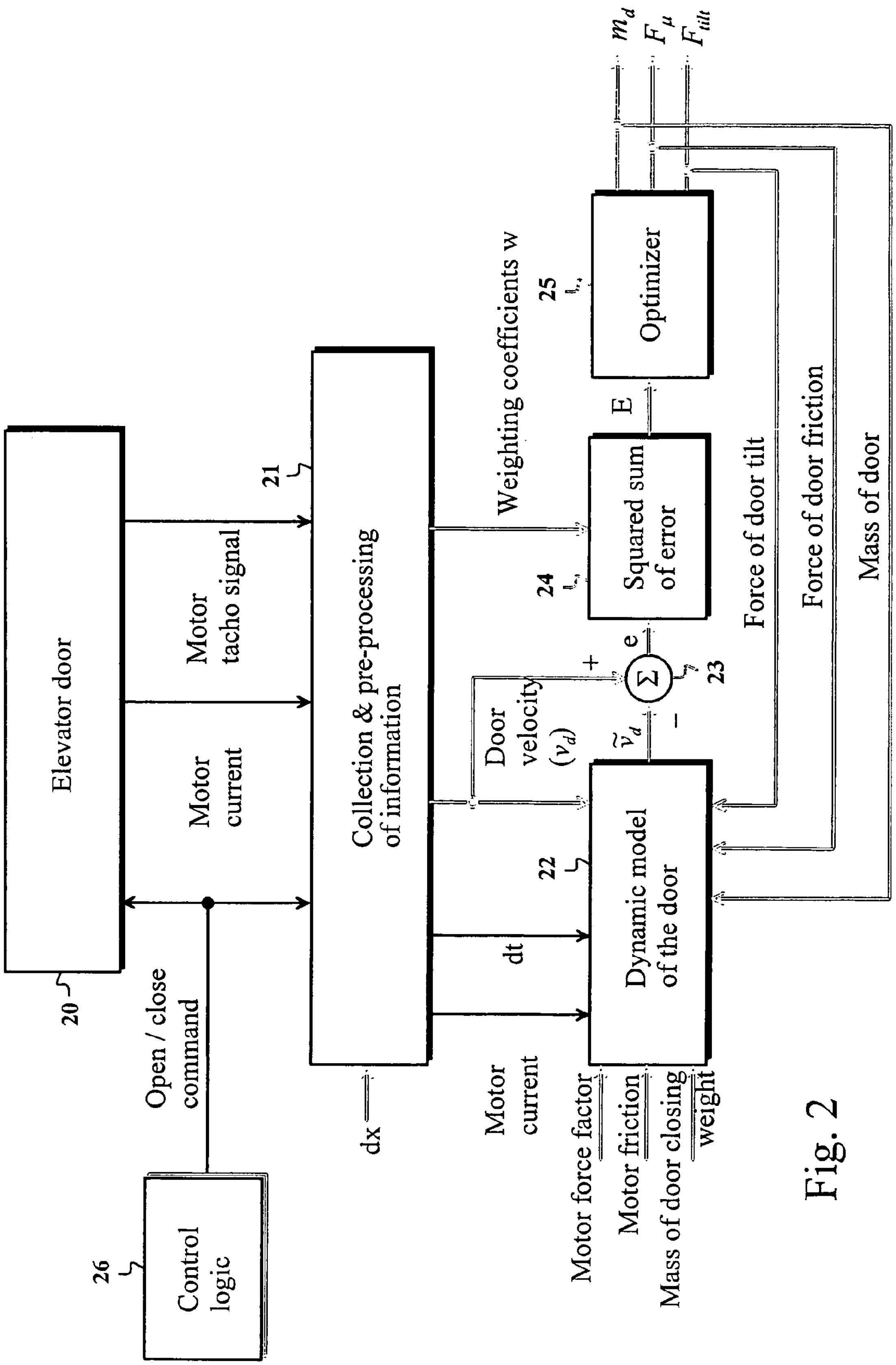
Figure 3:
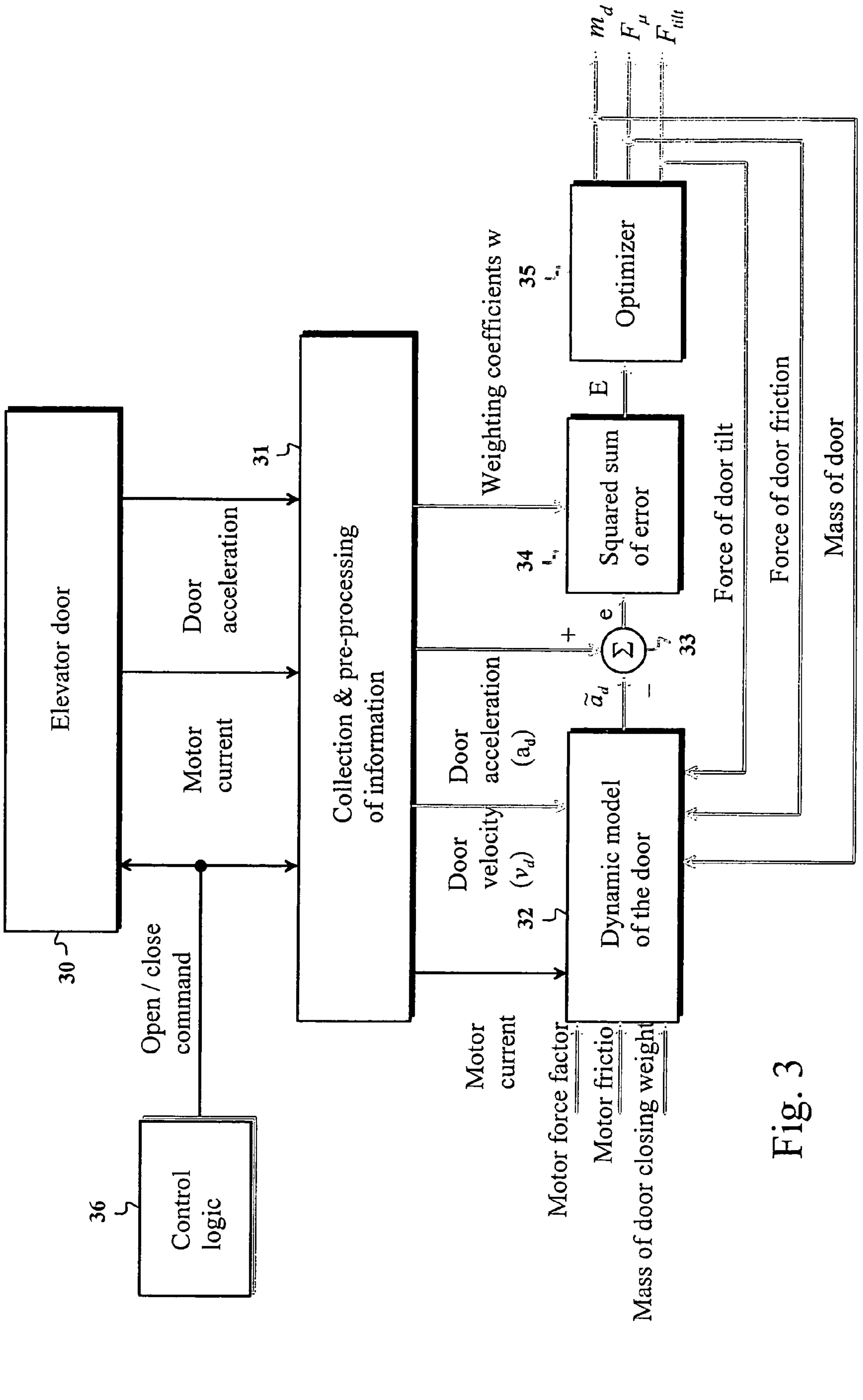
Figure 4:
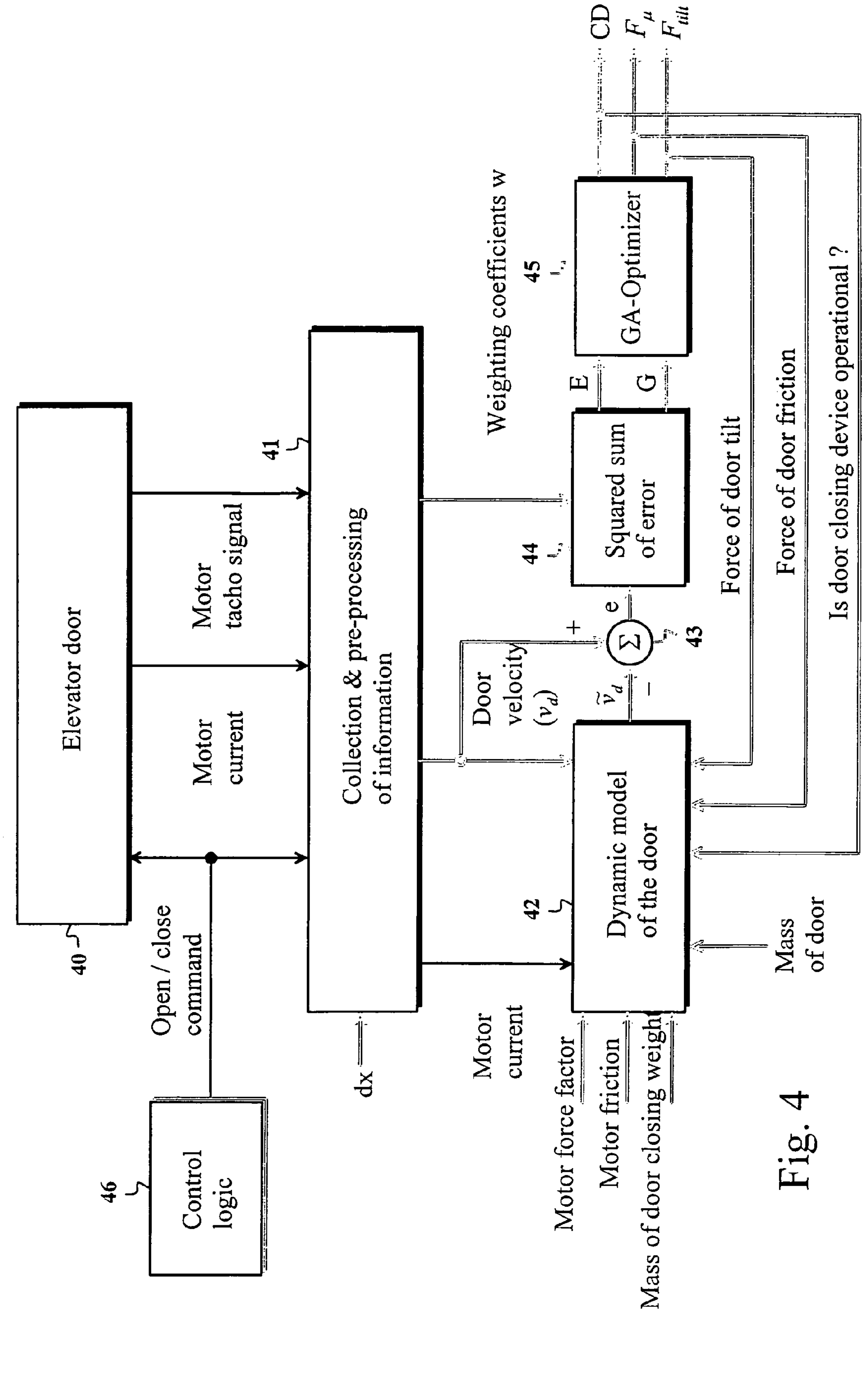

FIG. 1 presents a dynamic model of an automatic door according to the present invention, FIG. 2 represents a method according to the present invention for determining the unknown parameters of the model, FIG. 3 represents another method according to the present invention for determining the unknown parameters of the model, and FIG. 4 represents a third method according to the present invention for determining the unknown parameters of the model.

BRIEF DESCRIPTION OF THE INVENTION

To determine the frictional force acting on the door, a dynamic model of the automatic door is created, wherein the forces applied to the door are observed. The dynamic model of the door is presented in FIG. 1. The basic law used here is Newton's second law, whereby the force applied to an object is obtained as the product of the mass and acceleration of the object. Another basic law relating to friction gives the magnitude of the frictional force opposing the motion of an object as the product of the coefficient of friction and the force (for an object sliding on an even surface, the force of gravity) pressing the object against the surface being examined. For the sake of clarity, in the dynamic model all moving masses are assumed to be concentrated on an individual mass point $m_{door}$ 10. Correspondingly, all frictional forces present in the system, except for the friction of the motor, can be combined into a single concentrated frictional force term $F_{\mu,door}$. A model of the dynamic operation of the door system can be created using five different forces acting on it: force of the motor, force caused by the closing weight or spring, force caused by the angle of tilt of the door, internal frictional force of the motor, and frictional force caused by the door itself. The total mass of the system consists of the concentrated mass of the door 10 and the mass of a possible closing weight 11. All the moving masses comprised in the door mechanics are concentrated in the door mass 11. FIG. 1 shows the mass points and forces in the system as well as the positive directions of velocity and acceleration.

From the dynamic model and Newton's second law, an expression for instantaneous acceleration $\tilde{a}_{door}(t)$ of the door 10 is obtained:

$$\tilde{a}_{door}(t) = \frac{F_{motor}(t) + F_{tilt} - F_{cd}(x_d(t)) - \mathrm{sign}(v_d(t)) \cdot (F_{\mu Motor} + F_{\mu Door})}{m_{door} + m_{cd}}, \quad (1)$$

where $F_{motor}=Bl \cdot I_{motor}(t)$ and $F_{cd}(x_d(t))=md_{cd} \cdot g$ when the closing device is a weight and $F_{cd}(x_d(t))=k_{cd} \cdot (x_{d0}+x_d(t))$ when the closing device is a spring. Bl is the motor torque coefficient, $I_{motor}$ is the motor current, $F_{motor}$ is the force caused by the motor, $F_{tilt}$ is the horizontal component of the force caused by the tilt of the door, $F_{cd}$ is the force caused by the closing device, $F_{\mu Motor}$ is the internal frictional force of the motor, $F_{\mu Door}$ is the concentrated frictional force acting on the door and caused by all the sub-components, $m_{door}$ is the common concentrated mass consisting of all the door masses and $m_{cd}$ is the mass of the counterweight. If the closing device is a spring, then $m_{cd}=0$. As a closing weight is more commonly used as a closing device, hereinafter we shall only deal with a closing weight. However, this does not restrict the device of the invention exclusively to a closing weight, but the closing device may be a mechanism that gets its closing force from a spring or some other arrangement.

When samples of the quantities to be measured on the door are taken by means of the apparatus of the invention to determine the friction, this means a transition from the continuous-time world to discrete representation. In this case, (1) is changed to the form $$\tilde{a}_{door,k}=\frac{F_{motor,k}+F_{tilt}-F_{cd}(x_{d,k})-\mathrm{sign}(v_{d,k})\cdot(F_{\mu Motor}+F_{\mu Door})}{m_{door}+m_{cd}}, \quad (2)$$

where instant t has been replaced by a sample taken at this instant with the running number k.

Of the parameters of the dynamic model of the door, the mass of the closing weight, the torque coefficient of the motor and the internal frictional couple of the motor have to be known beforehand. The mass of the closing weight can be easily determined by weighing. The motor torque coefficient and the internal frictional couple of the motor can be determined by means of a dynamometer. Using a dynamometer, the motor torque can be measured as a function of motor current. The results obtained with different current values form an approximately straight line T, the equation for which is:

$$T(I_{motor})=Bl\cdot I_{motor}-T_{\mu Motor}-T_{\mu Dyn}, \quad (3)$$

where T is motor torque. By linear regression, the unknown quantities Bl and $T_{\mu Motor}$ can be determined as the slope of the regression line and its point of intersection with the y-axis.

From the motor torque, the force acting on the door can be obtained by taking into account the power transmission mechanisms of the door system. In an example, the motor shaft carries a belt pulley of radius r, and a toothed belt running around the pulley moves the door leaves. In this case, the force moving the door leaves is easily obtained as $F_{motor}=T/r$.

On the other hand, from the model it is possible to determine the unknown parameters, which in this connection are door mass, frictional force caused by tilt and frictional force acting on the door. Of these, the last mentioned parameter is the object of interest in a preferred embodiment of the present invention.

A method according to the present invention for determining unknown parameters is presented in FIG. 2. The motion of the elevator door 20 is controlled by a control logic 26, from which a command to open or close the door is received. The door is driven by a direct-current motor, which is connected to a door control card. From this card, the motor current and a so-called tacho signal can be measured directly. The tacho signal is obtained from the motor's tacho generator, which detects the mechanical speed of rotation of the motor. In this embodiment, the tacho signal is typically a signal having the shape of a square wave. The frequency and pulse spacing of the square wave are directly proportional to the speed of the door motor and the velocity of the door. Between two successive pulses, the door always moves through the same sub-distance dx.

The signals received from the control card and the commands given by the control logic are passed to a functional block 21 which takes care of collection and pre-processing of information. In this block, the door motion data is filtered to remove from it those door opening operations during which the door has to be re-opened in the midst of the closing movement because of an obstacle, typically a passenger in the path of the door. During the period dt between to tacho pulses, the door moves through a constant sub-distance dx. In block 21, it is now possible to calculate the velocity $v_d$ of the door at each instant k of time:

$$v_{d,k}\frac{dx}{dt_k} \quad (4)$$

The pre-processing block also calculates weighting coefficients for later calculation of an error term. By using weighting coefficients, desired error terms can be weighted more than others. In the pre-processing block 21, all the information relating to door opening and closing operations is combined for further processing.

The next step in the method is processing of the dynamic model 22 of the door. The model was described above and illustrated in FIG. 1. As stated above, the input parameters fed into the model are motor torque coefficient, frictional couple of the motor, mass of door closing weight, motor current, period of time dt and velocity $v_d$ of the door. In the model, the acceleration of the door is estimated as a function of four variables as follows.

$$\tilde{a}_{d,k}(m_d,F_\mu,F_{tilt})=\frac{\sum F_k(m_d,F_\mu,F_{tilt})}{\sum m}, \quad (5)$$

where $\Sigma F_k(\bullet)$ is the sum of the forces acting on the door at instant k. From the estimated acceleration of the door, the velocity of the door can be estimated as follows:

$$\tilde{v}_{d,k}(m_d,F_\mu,F_{tilt})=v_{d,0}+\sum_k \tilde{a}_{d,k}(m_d,F_\mu,F_{tilt})\cdot dt_k, \quad (6)$$

where $v_{d,0}$ is the velocity of the door at instant t=0.

In the next step, the estimated velocity of the door and the door velocity calculated in the pre-processing block are passed into a differential block 23. The estimated instantaneous velocity is subtracted from the measured instantaneous velocity, producing an error term $e_k$ as a result. The error term $e_k$ is a function of the three variables $m_d$, $F_\mu$ and $F_{tilt}$. By applying weighting coefficients $w_i$, a so-called squared error term E can now be calculated in block 24:

$$E(m_d,F_\mu,F_{tilt})=\sum_k w_k e_k(m_d,F_\mu,F_{tilt})^2=\min \quad (7)$$

In the next step in the block diagram of the method of the present invention, the squared error term E is transferred to an optimizer 25. The function of the optimizer is to minimize the function (7) of the three variables. When the minimum value is found, the variable parameters corresponding to this have been estimated for the mass of the door, the frictional force opposing the motion of the door and the force caused by the tilt of the door.

In the examples illustrated in FIG. 2-4 and in the model in FIG. 1, it is possible to define one or more of the force parameters in the model as constants if it is desired to simplify the model and the calculation under certain assumptions.

FIG. 3 presents another example of the method of the invention for detecting a failure of an automatic door. The operation in this example is very close to the method presented in FIG. 2. The control logic 36 of the elevator system issues an opening or closing command to the door. In the case of elevators in which no motor tacho signal is available, the motion of the elevator door must be observed by other methods. One method is to mount on a door leaf 30 an acceleration sensor to monitor the acceleration of the door. The measured acceleration $a_d$ is passed to a block 31 for collection and pre-processing of information. As in the above-described block 21, the door motion data is filtered to remove from it those door opening operations during which the door has to be re-opened in the midst of the closing movement because of an obstacle in the path of the door. After this, the velocity $v_d$ of the door is calculated in block 31 from the following basic formula:

$$v_{d,k} = v_{d,0} + \sum_k a_{d,k}(m_d, F_\mu, F_{tilt}) \cdot dt_k, \tag{8}$$

where $v_{d,0}$ is the initial velocity of the door at instant t=0. In other respects, the pre-processing block 31 works like the pre-processing block 21 in FIG. 2. The signals between block 31 and the dynamic model 32 of the door are consistent with the method of FIG. 2 with the difference that the error term E is calculated from acceleration values instead of velocities.

In the model 32, an estimated door acceleration is calculated from equation (5). This information is fed directly into a differential block 33, where the measured acceleration, which in this case is obtained from the sensor, and the estimated acceleration obtained from the model are subtracted from each other. This produces an error term e, which is a three-variable function of the same type as in the example in FIG. 2. The error is squared with desired weightings in block 34 in the way described above. Correspondingly, optimizer 35 works in the same way as optimizer 25. As a result, the same three unknown parameters are obtained as above.

In an embodiment of the model, the three unknown parameters of the model are determined once in conjunction with the start-up of the system. To ensure the accuracy of the parameters, several door operations are needed for each floor. A suitable estimate for the number of door operations is at least ten. When the system is subsequently in its operating condition, the previously defined model of the system is in use and this makes it possible to compare the existing model to recently collected new information about the motion of the door. After the comparison it is possible to conclude e.g. whether the frictional force $F_\mu$ has changed significantly. A clearly increased friction between the door and the door rail is quickly detected from the error terms $e_k$, i.e. from the residuals of the model.

The residuals of the model can be e.g. analyzed statistically. It is possible to evaluate e.g. the mean value, variance, distortions of distribution, and number of peaks. The error term can also be analyzed in respect of frequency range. By these methods of analysis, it is possible to determine characteristics typical of different failure situations. For example, an increase of the friction opposing the motion of the door will appear as a deviation of the mean value of the residuals from zero. For an analysis of failure type from the statistical quantities or the frequency range signal it is naturally required that failure types can be clearly distinguished from each other and from an error-free operating condition by examining the amplitudes and frequencies of the spectrum components. This may be difficult.

In another embodiment of the model, an analysis of the operational condition of the door can preferably be performed each time the door is closed or opened. The method in this case is one of continuous detection. The processing and analysis of the collected information have to be carried out within the period of time between two door operations. In the case of an elevator, this processing period should be of the order of max. 15 seconds, which is the time needed by the elevator in a driving cycle between two successive floors. Of course it is not absolutely necessary to include every door operation in the analysis. Therefore, it does not matter if the analysis of one door operation should take more time than about 15 seconds as stated above. In this case the efficiency of fault diagnosis is naturally impaired. Even if not every door operation is included in the analysis, it is still important to count the number of all floor-specific door operations. This is an essential item of information when in the event of a failure the average useful life of the door is to be determined.

The analysis performed by the optimizer can be simplified by assuming the door mass to be constant. Anyway, the door mass has to be defined in connection with the start-up of the system. In practice, the model is given a constant door mass value which is determined e.g. as an average of the mass values obtained from the first 20 door operations at each floor. After this "teaching period", the function of the optimizer is to find values for two unknown parameters, the friction opposing the motion of the door and the force caused by the tilt of the door. The amount of computing work is now reduced and the search for parameters becomes easier. After the teaching period, the method in this example of the present invention works like the method presented in FIG. 3, with the difference that $m_d$ is now a fixed constant parameter and that both $e_k$ and E are functions of two parameters.

A typical door failure situation is for example a fault occurring in the bearing of a roller guiding the door, preventing smooth sliding of the door on the roller. In such a situation, the frictional force $F_\mu$ of the door mechanism increases either abruptly or slowly with time, depending on the nature of the failure. One possibility is to determine from this information the need and time for maintenance.

Another possible type of fault is a failure of the door closing device. Such a fault may arise e.g. when the closing weight has been removed in connection with maintenance and the serviceman has forgotten to mount it again. A failure may be due to the wire cable of the closing weight being broken. Such a fault appears as a sudden and large increase in the force $F_{tilt}$ caused by the tilt of the door. It can be inferred that such a large tilt of the door is not due to a real tilt but to a disappearance of the closing force. In this connection there arises a need to automate the process of inferring the operational condition of the closing device by a suitable method. Genetic algorithms can be utilized for this purpose. Using these algorithms, it is possible to determine both the right door model (in which a closing device is either included or not) and the unknown forces $F_{\mu Door}$ and $F_{tilt}$. While searching for the forces of friction and tilt, the genetic optimizer simultaneously finds the system model that produces the smallest force of tilt.

Genetic algorithms are based on the principle of creating an artificial evolution by using the computing logic of a processor. The question at issue is how to obtain as advantageous a final result ("phenotype") as possible by varying the properties of a "population". In the process of variation, the genetic operations used are "selection", "hybridization" and "mutation". The strongest members of the population "make it", and the properties of these ones are passed on to the next generations. In an example of the method of the present invention, the population is a number of model parameter vectors. In this connection, one parameter vector corresponds to one chromosome. Each chromosome has genes. Each gene in this connection corresponds to one of the model parameters to be estimated, which now are operation of the closing device, frictional force of the door, and force of tilt of the door. These three genes together can be called a phenotype. The operation of the genetic algorithm is such that first a population is created with gene values selected at random. For each chromosome in the population, an "efficiency" or a quality value is calculated, which in this example is the above-described squared error term computed from the dynamic model of the door. In the genetic algorithm, the search proceeds generation by generation. From each generation, the most efficient chromosomes, i.e. the ones that give the lowest squared error term value, are selected and included in the next generation. From the best alternatives after this selection, the next generation is created via hybridization and mutation. As a result of the genetic operations, a new kind of population is obtained in which the genotype of the chromosomes differs from the earlier population either completely or only in some of the genes. For the new generation, an efficiency, i.e. squared error terms are calculated, and a chromosome having the best efficiency is again obtained as a result. After this, the sequence of numbers of the squared error terms is checked to see if it converges and if a sufficient number of generations have been processed to guarantee convergence. As a final result, the genes of the best individual in the last generation reveal the magnitudes of the unknown forces and the operational condition of the closing device.

The operation of the above-described genetic algorithm can be combined with both of diagrams 2 and 3. Diagram 4 represents the operating principle by way of example when the genetic algorithm is combined with diagram 2. In the automatic door 40, the current of the door motor and the tacho pulse signal of the motor are measured. In the pre-processing block 41, the door velocity is calculated, and the result is passed to the differential block 43 and to the model 42 of the door. In this example the door mass is assumed to be constant. In the model, the door velocity is estimated and likewise passed to the differential block 43. A squared error term calculator 44 and a so-called GA optimizer 45 form a loop, whose operation was described above in connection with the description of the genetic algorithm. The information about the genes is transferred from the GA optimizer 45 to the error calculator 44 and correspondingly the efficiency value, i.e. the squared error term E is passed from the error calculator 44 to the GA optimizer 45. As a final result of the search, the optimizer gives parameters CD, $F_{\mu Door}$ and $F_{tilt}$. CD means the operational condition of the closing device, where e.g. the value one may represent error-free operation of the closing device and zero a failure of the closing device. These three parameters are returned back to the model, so the model takes the performance of the closing device immediately into account. Thus, in addition to the force parameters, the model that best describes the system is found immediately. The door opening and closing commands come from the door control system 46. The dynamic model of the door is now $$\tilde{a}_{door,k} = \frac{F_{motor,k} + F_{tilt} - CD \cdot F_{cd}(x_{d,k}) - \text{sign}(v_{d,k}) \cdot (F_{\mu Motor} + F_{\mu Door})}{m_{door} + CD \cdot m_{cd}}, \tag{9}$$

where the term CD is one when the closing device is in operation, and CD is zero when the closing device does not work. In order that the genetic algorithm should be able to find the system model that produces the smallest tilt angle, the force of tilt $F_{tilt}$ is also included in the error function $$E(CD, F_\mu, F_{tilt}) = \sum_k w_k e_k(CD, F_\mu, F_{tilt})^2 + (G < G1) \cdot K \cdot F_{tilt} = \min, \tag{10}$$

where K is a scaling coefficient, G is the sequential number of the generation in the genetic algorithm and G1 is a limit value for generation G after which the force of tilt is no longer included in the error function (10). The result of this arrangement is that in the early stage of the search, when G<G1, the search will find the correct model of the system while during the final stage the parameters $F_m$ and $F_{tilt}$ are given more exact values.

In practice, when a genetic algorithm is used, a period of time during which the mass of the door can be determined sufficiently accurately is needed in connection with the start-up of the system. During the teaching period it is assumed that the closing device is in operation, and after the first door operation the values of $m_d$, $F_{\mu Door}$ and $F_{tilt}$ are determined. The calculation is repeated after a sufficient number of door operations until the calculated door mass value is found to be sufficiently converged. After this teaching period, the system is operated in the actual condition monitoring mode in which the mass of the door is assumed to be constant while parameter CD is not. This operational condition was described above in connection with the description of FIG. 4.

As an example we may consider the frictional force $F_\mu$, when the closing device is excluded from the system (CD=0). The frictional force is typically reduced to a slightly lower level. This is due to the fact that both the motion of the counterweight and the motion of the cable connecting the counterweight to the door are resisted by friction. Therefore, when no counterweight is included in the system, the total friction acting on the door is reduced.

In long-time measurement of the frictional force acting on the door, it is possible to monitor the rate of change of the friction. When the rate of change of frictional force caused by wear during normal operation is known, it can be seen whether any unusually intensive wear has taken place by the moment of observation or whether there is any other reason to suspect a sudden failure. From the behavior (typically steady increase) of the frictional force observed during a long time interval, it is possible to try and estimate a point of time when the risk of failure will exceed a given risk limit.

If the frictional force increases in a stepwise manner at a given instant of time, there is reason to suspect a serious fault regarding the functionality of the system. If additionally an extra noise is audible during the motion of the door, then it can be regarded as almost certain that a fault situation is at hand. Conclusions can also be drawn from the way in which the magnitude of the frictional force behaves after a stepwise jump like this. The force may remain constant or it may either increase or decrease steadily.

When a new automatic door is taken into use, its operation begins with a so-called breaking-in period, during which the parameters received from the optimizer may change somewhat as a function of time. After the breaking-in period there follows a period of actual steady operation during which the parameters of the system (door) in practice remain constant for a long time. On the other hand, during the period of steady operation the parameter values may also typically be better than the parameter values during the breaking-in period. After the period of steady operation, there begins to occur some loosening of moving parts and some stretching of parts liable to stretching. For instance, the rollers guiding the motion of the door on the rail may creep or undergo wear until some of the rollers are no longer in contact with the door.

An increase of friction may arise from many different causes. Dirt is accumulated on the door rail, forming an impediment to smooth movement of the door on the rail. On the other hand, in places where friction necessitates lubrication, too much lubricating oil may be used and therefore the door does not move in the desired manner. Dirt is easily accumulated especially on the threshold as elevator customers often step on it when entering the elevator car. A motor failure naturally appears from the parameters obtained by the method of the present invention. Fraying of the cable between the counterweight and the door also appears as an increased value of the parameter $F_{\mu Door}$. A pulse-like increase of friction may be due to an external mechanical stimulus applied to the door, such as e.g. a hard bump occurring when objects are being loaded into the car. A fault in the door suspension may also cause a sudden increase in the frictional force. This may also occur in consequence of a wire being broken in the cable of the closing weight. If in addition to a change in frictional force any extra noise is heard from the system, then maintenance personnel should be immediately called to the site. If the magnitude of the frictional force remains constant after a pulse-like increase of friction, then the situation should be taken into account in connection with the next planned round of maintenance of the elevator system, but immediate action is not necessarily needed in this situation. The wear of the components comprised in automatic doors causes a slow degradation of performance, which may be either essential or insignificant for perfect operation of the door.

If an increased variance (square of standard deviation) of the frictional force is detected, then it can be concluded that wear of the door mechanism has advanced. The play of the components is increased and the paths of moving parts gradually begin to differ significantly from a new door system with small tolerances. The mean value of the frictional force may well remain steady even if the variance increases. The situation may also involve a rise in the level of noise produced by the motion. The variance can be regarded as an indicator of the degree of wear.

The season may have an effect on the door system parameters obtained in conjunction with condition monitoring. If the door is exposed to extraordinary heat, coldness or humidity, these changes in conditions may also be reflected on the friction acting on the door. In consequence of a heavy traffic intensity the motor may also develop extra heat, which causes a decrease of its power. In this case, the system interprets the situation as an increased friction, but the actual cause is a decrease in the power of the motor. Similarly, the first door operations in the morning may produce higher friction values than usual because the system experiences, as it were, a “cold start” after the nightly pause in operation. An example of a changeable environmental influence acting on the doors on different floors are the differences of air pressure at different floor levels. The ventilation system may produce an air flow of different magnitude against the door, depending on the floor on which the door in question is situated.

A basic method for detecting a faulty door is to compare the parameters $F_{tilt}$ and $F_{\mu Door}$ for the doors of different floors. If $F_{tilt}$ for one of the floors differs significantly from the general line, it can be inferred that the mounting angle of the landing door on the floor in question is different from the other doors. On the other hand, a $F_{\mu Door}$ value significantly deviating from the other floors may signify that the adjusting rollers of the landing door have been mounted differently from the other doors.

One of the advantages of the present invention is that the information relating to the operation of the door can be stored. In this way, a data base covering the operating history of the door is created, on the basis of which it is possible to plan e.g. a suitable date for the next maintenance. From the operating history, the present state of operation of the door can be inferred directly, and even the probability of failure and the need for maintenance at a future point of time can be predicted. From the database it is further possible to infer what is the duration of the breaking-in period and how long is the period of steady operation of the door. The effect of maintenance operations can also be seen from the database.

It is obvious to the person skilled in the art that the invention is not limited to the embodiments described above, wherein the invention has been described by way of example, but that different embodiments of the invention are possible within the scope of the inventive concept defined in the claims presented below.

The invention claimed is:

1. A method for monitoring the condition of an automatic door in a building, the method comprises:

measuring the acceleration or velocity of the door and the torque of a door motor driving the door;

creating a dynamic model of the door, which includes as a part of it the forces acting on the door;

modeling the acceleration or velocity of the door by utilizing the dynamic model of the door;

calculating an error term as the difference between measured and estimated values of acceleration or velocity of the door;

calculating the frictional force applied to the door by minimizing the aforesaid error term or an expression derived from it and containing the error term; and deducing the operational condition of the door by comparing the calculated frictional force and its change to reference values.

2. A method according to claim 1, further comprises:

measuring the acceleration of the door by using an acceleration sensor.

3. A method according to claim 1, further comprises:

measuring the velocity of the door by using a signal proportional to velocity, obtained from the door motor.

4. A method according to claim 1, further comprises:

using as parameters in the dynamic model one or more of the parameters: velocity of the door, current of the motor driving the door, torque coefficient of the motor, frictional couple of the motor, force factor of a door closing spring and mass of a door closing weight; modeling the acceleration and velocity of the door in the model as a function of one or more parameters, these parameters being mass of the door, frictional force applied to the door and force caused by the angle of tilt of the door;

calculating a first error function as the difference between a measured instantaneous door velocity and an instantaneous door velocity modeled in the model;

calculating a second error function by squaring the first error function and summing the squared first error functions obtained over a given period of time, using desired weighting coefficients;

calculating one or more of the parameters: door mass, frictional force applied to the door, and force caused by the angle of tilt of the door, by minimizing the second error function; and feeding the calculated parameters back to the dynamic model for use in the next cycle of calculation.

5. A method according to claim 1, further comprises:

using as parameters in the dynamic model one or more of the parameters: acceleration of the door, current of the motor driving the door, torque coefficient of the motor, frictional couple of the motor, force factor of a door closing spring and mass of a door closing weight;

modeling the acceleration of the door in the model as a function of one or more parameters, these parameters being mass of the door, frictional force applied to the door and force caused by the angle of tilt of the door;

calculating a third error function as the difference between the measured instantaneous acceleration of the door and the instantaneous acceleration of the door modeled in the model;

calculating a fourth error function by squaring the third error function and summing the squared third error functions obtained over a given period of time, using desired weighting coefficients;

calculating one or more of the parameters: door mass, frictional force applied to the door, and force caused by the angle of tilt of the door, by minimizing the fourth error function; and feeding the calculated parameters back to the dynamic model for use in the next cycle of calculation.

6. A method according to claim 1, further comprises:

determining the value of the door mass in connection with the start-up of the system; and defining the door mass as a constant in the dynamic model of the door.

7. A method according to claim 1, further comprises:

using a genetic algorithm for detecting a failure of the door closing device;

using in the genetic algorithm a chromosome that consists of genes describing the operation of the closing device, the frictional force applied to the door and the force caused by the angle of tilt of the door;

using a squared error function as a quality value of the genetic algorithm; and using the dynamic model of the door in determining the phenotype of the genetic algorithm.

8. A system for monitoring the condition of an automatic door of an elevator or building, said system comprising:

at least one door, which slides horizontally in its mounting place;

a control system for opening and closing the door;

a measuring unit measuring the acceleration or velocity of the door and the torque of a motor driving the door;

a dynamic model of the door, including the forces acting on the door;

a modeling unit modeling the acceleration or velocity of the door by utilizing the dynamic model of the door;

a first calculating unit for calculating an error term by using information regarding the measured and modeled acceleration or velocity of the door;

a second calculating unit for calculating the frictional force applied to the door to minimize the aforesaid error term or an expression derived from it and containing the error term; and a control unit of inferring the operational condition of the door for comparing the measured frictional force and its change to reference values.

9. A system according to claim 8, further comprises: a door control card as a door control system.

10. A system according to claim 8, further comprises:

an acceleration sensor measuring the acceleration of the door.

11. A system according to claim 8, further comprises:

a signal proportional to velocity and obtained from the door motor, used for measuring the velocity $v_d$ of the door.

12. A system according to claim 8, further comprises:

a determining unit determining one or more parameters of the dynamic model via operations including measurement of the velocity $v_d$ of the door, measurement of the current of the motor driving the door, determination of the torque coefficient of the motor, determination of the frictional couple of the motor, determination of the force factor of a door closing spring, and measurement of the mass of a door closing weight;

a modeling unit modeling the velocity of the door in the dynamic model, said velocity being defined as a function of one or more parameters, these parameters being mass of the door, frictional force applied to the door and force caused by the angle of tilt of the door;

the first calculating unit calculating a first error function, said function being obtained as the difference between a measured instantaneous door velocity and an instantaneous door velocity modeled in the model;

the second calculating unit calculating a second error function, said second error function being obtained by squaring the first error function and summing the squared first error functions obtained over a given period of time, using desired weighting coefficients;

a first optimization unit for minimizing the second error function, working out one or more of the parameters: door mass, frictional force applied to the door, and force caused by the angle of tilt of the door; and a first feedback for passing the calculated parameters to the dynamic model for use in the next cycle of calculation.

13. A system according to claim 8, further comprises:

a determining unit determining one or more parameters of the dynamic model via operations including measurement of the acceleration of the door, measurement of the current of the motor driving the door, determination of the torque coefficient of the motor, determination of the frictional couple of the motor, determination of the force factor of a door closing spring, and measurement of the mass of a door closing weight;

the modeling unit modeling the acceleration of the door in the dynamic model (32), said acceleration being defined as a function of one or more parameters, these parameters being mass of the door, frictional force applied to the door and force caused by the angle of tilt of the door;

the first calculating unit calculating a third error function, said error function being obtained as the difference between the measured instantaneous acceleration of the door and the instantaneous acceleration of the door as modeled in the model;

the second calculating unit calculating a fourth error function, said fourth error function being obtained by squaring the third error function and summing the squared third error functions obtained over a given period of time, using desired weighting coefficients (31);

a second optimization unit means for minimizing the fourth error function, working out one or more of the parameters: door mass, frictional force applied to the door, and force caused by the angle of tilt of the door; and a second feedback for passing the calculated parameters to the dynamic model for use in the next cycle of calculation.

14. A system according to claim 8, further comprises:

third optimization unit for using a genetic algorithm to detect a failure of the door closing device;

the third optimization unit using one or more parameters in the genetic algorithm as genes of a chromosome, these parameters being operation of the closing device, frictional force applied to the door and force caused by the angle of tilt of the door;

the third optimization unit using a squared error function as a quality value of the genetic algorithm; and the third optimization unit for using the dynamic model of the door in determining the phenotype of the genetic algorithm.

* * * * *